June 13, 1939.  C. S. HAZARD  2,162,254
LIQUID MEASURING DEVICE
Filed March 4, 1936
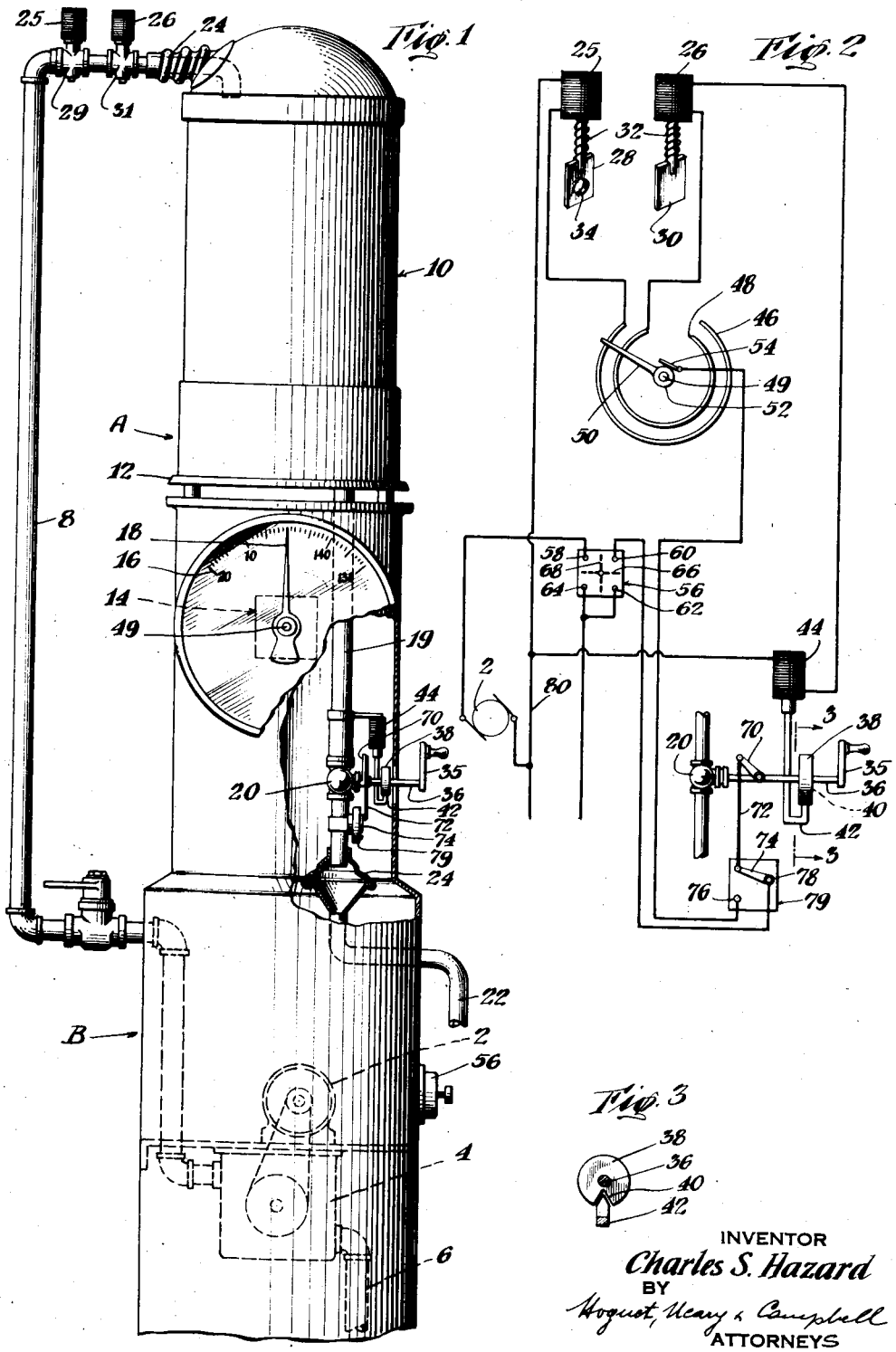
INVENTOR
*Charles S. Hazard*
BY
*Hoguet, Neary & Campbell*
ATTORNEYS Patented June 13, 1939

2,162,254

UNITED STATES PATENT OFFICE 2,162,254

LIQUID MEASURING DEVICE

Charles S. Hazard, New York, N. Y., assignor to Neptune Meter Company, a corporation of New Jersey Application March 4, 1936, Serial No. 67,037

7 Claims. (Cl. 73—2)

The present invention is directed to a visible bowl dispensing device, in which the liquid delivered to the bowl and dispensed therefrom is measured in units of weight.

Visible bowl dispensing devices in current use consist of a calibrated bowl into which a predetermined volume of liquid is delivered. The capacity of the bowl is controlled by a fixed overflow pipe. Any desired fraction or the whole of the volume of liquid in the bowl may be dispensed by means of a drain valve or by regulating the height of an adjustable drain pipe in the bowl.

The present invention differs from the above described visible bowl dispensing devices, in that a predetermined weight of liquid is delivered to the bowl, there being no overflow pipe provided because the weight of liquid delivered to the bowl is always the same.

An object of the invention is to deliver to the bowl and to dispense therefrom uniform units of liquid, such as, gasoline, so that identical amounts of energy of combustion for a given gasoline may be obtained from the same unit of measure, regardless of variation in volume resulting from variations in temperature.

A further object of the invention is to produce a dispensing device which is automatic in operation and will in every instance under normal conditions of temperature deliver a predetermined weight of liquid to the bowl.

A still further object of the invention is to provide a dispensing device in which the means for delivering liquid to the bowl is interlocked with means for dispensing liquid from the bowl, whereby one of the foregoing is rendered inoperative, whenever the other is in operative condition, that is, liquid cannot be delivered to the bowl while liquid is being dispensed and liquid cannot be dispensed while liquid is being delivered to the bowl.

More specifically, the present invention is directed to an apparatus including a bowl, means for delivering liquid to the bowl and means for weighing the liquid in the bowl. The means for delivering liquid to the bowl is interconnected with the weighing means by electrical controls, whereby the liquid is delivered to the bowl at a predetermined rate of flow until the weight thereof in the bowl approaches a predetermined point, after which the rate of flow is decreased until the predetermined point is reached, at which point the flow is stopped. By this construction the weight of liquid delivered to the tank is accurately regulated and variations in climatic conditions will have no effect upon the weight of liquid delivered. The weighing device is arranged and constructed to register the weight of liquid dispensed from the bowl rather than the weight of the liquid in the bowl, whereby necessity for calculating the weight of liquid as it is dispensed is avoided.

The dispensing means is interconnected with the fluid delivery means by electrical connections which are interrupted when the dispensing means is operative, and, when the delivery means is operative, the dispensing means is locked in inoperative positoin.

For a more complete understanding of the invention, reference may be had to the accompanying drawing, in which:

Fig. 1 is a view in elevation, partly broken away, of the dispensing apparatus embodying the invention, Fig. 2 is a diagrammatic showing of the electrical circuit of the apparatus, and Fig. 3 is a sectional view taken on line 3—3 of Fig. 2 of a detail of the dispensing valve latch.

The dispensing device A consists of a housing and framework B, in which is supported a motor 2 driving a pump 4, the latter being connected by suitable conduits 6 and 8 to a source of supply (not shown) and a bowl 10, respectively. The bowl 10 is supported on a scale platform 12, connected to a weighing device 14 of any desired kind.

In a wall of the housing B is mounted an indicator dial 16, illustrated as calibrated in pounds from 0 to 140. Cooperating with the scale 14 is an indicator hand 18, movable in a counterclockwise direction from 0 to 140, indicating 140 when the bowl is empty and 0 when the tank contains 140 lbs. of fluid.

From the bottom of the bowl 10, extends a dispensing conduit 19, having a valve 20 therein, this conduit 19 discharging into the usual dispensing hose 22. The conduits 19 and 8 are losely connected to hose 22 and bowl 10, respectively, to permit free action of scale 14. Flexible connections 24 may be provided for preventing losses through evaporation of the fluid.

Mounted on the conduit 8 are two solenoids 25 and 26 retracting gate valves 28 and 30, respectively, from the conduit 8. The valves 28 and 30 are normally urged into their seats 29 and 31, respectively, in the conduit 8 by springs 32. As shown in Fig. 2, valve 28 is provided with a small aperture 34 and valve 30 is imperforate, for a purpose to be described.

Dispensing valve 20 is operated by crank 35 mounted on shaft 36. Also mounted on shaft 36 is a disc 38 having a notch 40 in its periphery, as shown in Fig. 3. At times engaging in notch 40 and at other times retracted from the notch is a latch 42 operated by solenoid 44. The solenoid is mounted on conduit 19 for movement with bowl 10 and scale platform 12.

Referring now to Fig. 2, mounted on the dial 16 of the scale 14 are two concentric segments 46 and 48, the former terminating at a point ahead of the latter in a clockwise direction as viewed in Fig. 2. Connected to the indicator hand 18 or fixed on indicator hand shaft 49, is a contact arm 50, having a slip ring 52 contacting with a brush 54 for energizing the segments 46 and 48.

Mounted on the housing B is a two-way master switch 56 having contacts 58, 60, 62 and 64 and crossed switch blades 66 and 68 insulated from each other.

Projecting from crank shaft 36 is an arm 70 connected by link 72 to a switch blade 74 for opening and closing the circuit through the contacts 76 and 78, in switch 79 mounted on conduit 19. The valve 20 and arm 70 are so arranged that when the valve is open, the blade 74 cannot close the circuit, and when the valve 20 is closed the circuit is closed between contacts 76 and 78 by blade 74.

The electrical connections between the various elements of the device are as follows:

One side of an electrical supply line 80 is connected to one terminal of motor 2, and to one terminal of solenoids 25 and 44. The other terminal of motor 2 is connected to contact 58 of master switch 56. The other terminal of solenoid 25 is connected to segment 46. The second terminal of solenoid 44 is connected to solenoid 26 and through the solenoid 26 to segment 48, so that solenoids 44 and 26 are connected in series. Brush 54, contacting slip ring 52 and connected through contact arm 50 with segments 46 and 48, is connected to contact 76 of switch 79. Contact 78 is connected to contact 60 of master switch 56. Contacts 62 and 64 are connected to the other side of supply line 80 or to ground.

Accordingly, when master switch 56 is closed in "on" position, the motor 2 will be started regardless of the condition of the remainder of the dispensing device A. However, if switch 79 is "off" none of the solenoids 44, 25 and 26 will be energized. If valve 20 is closed and switch 79 is in "on" position with bowl 10 empty or partially so, the current will flow from one side of supply line 80 through solenoid 25, segment 46, arm 50, slip ring 52, brush 54, switches 79 and 56 to the other side of line 80. A branch circuit includes solenoid 44 in series with solenoid 26, segment 48, arm 50, slip ring 52 and brush 54 to the other side of line 80 through switches 79 and 56. If arm 50 is not in engagement with segment 46, the circuit through solenoid 25, only, is interrupted, and valve 28 is closed by spring 32. When contact arm 50 disengages segment 48, the circuit through solenoids 26 and 44 is interrupted and valve 30 is closed by spring 32 and latch 42 is released.

In operation, assuming valve 20 to be closed, bowl 10 to be empty, and switch blade 74 closing the circuit through contacts 76 and 78, actuation of master switch 56 to close the circuits through contacts 58, 60, 62 and 64, energizes motor 2 and solenoids 25, 26, and 44 retracting valves 28, 30 and drawing latch 42, into notch 40 in disc 38, respectively. Liquid is accordingly delivered by the pump 4 to bowl 10 and valves 28 and 30 are open. The latch 42 locks dispensing valve 20 against operation by crank 35. As the bowl 10 fills, the indicator hand 13 will turn clockwise towards 0, and contact arm 50, moves clockwise with it over segments 46 and 48. As the indicator hand 18 approaches 0, contact arm 50 rides off the end of segment 46, deenergizing solenoid 25 and valve 28 snaps shut, reducing the flow of liquid to that which can pass through aperture 34. The bowl 10 will then be filled more slowly until the indicator hand 18 reaches 0, at which point the contact arm 50 rides off segment 48, deenergizing solenoids 26 and 44. Valve 30 accordingly snaps shut, thereby stopping the flow of liquid while valve 20 is released by latch 42. The master switch 56 may be then moved to "off" position stopping the motor 2. While valve 20 is open, the electrical circuit through the solenoids 25, 26 and 44 cannot be energized because switch 79 is open, thereby preventing delivery of liquid to bowl 10.

While my invention has been illustrated as a gasoline dispensing device, it will be understood that it can have many other uses, and that the valve control mechanism can be varied, and the delivering and dispensing interlock system may be altered without departing from the invention as defined in the following claims.

I claim:

1. A liquid dispensing device, comprising a chamber for receiving liquid, means for weighing the liquid in the chamber, including an indicator, means controlled by movement of the weighing means for delivering liquid to the chamber at a high rate until a predetermined weight has been nearly reached and then continuing the delivery at a lower rate until the predetermined weight has been reached, and means for dispensing liquid from the chamber, said indicator registering zero when the predetermined weight of liquid is in the chamber, and moving away from zero in proportion to the weight of liquid dispensed.

2. A liquid dispensing device comprising a receptacle for receiving liquid, means for delivering liquid to said receptacle, means for weighing the liquid in the receptacle, a pair of valves normally urged to closed position controlling the delivery of liquid to the receptacle, one of said valves having an aperture therein, electrically operated means for holding the valves open, spaced contact members connected to the electrically operated means, means controlled by the weighing means cooperating with said contact members for successively releasing the valves for movement to a closed position whereby the apertured valve first reduces the flow of liquid and the other valve terminates the flow of liquid, means for dispensing liquid from said receptacle and electrically operated means electrically connected to said first named electrically operated means and said contact members allowing dispensing of liquid only when liquid is not being delivered to the receptacle.

3. A liquid dispensing device comprising a receptacle, means for delivering liquid to the receptacle, an apertured valve and an imperforate valve normally urged to closed positions controlling the delivery of liquid to the receptacle, means for weighing the liquid in the receptacle, means associated with the weighing means for releasing the apertured valve for movement to closed position to reduce the flow of liquid as the liquid delivered to the receptacle approaches a predetermined weight, then releasing said imperforate valve for movement to closed position when the liquid delivered to the receptacle reaches the said predetermined weight, means including another valve for dispensing liquid from the receptacle, and means operatively connecting said other valve with the apertured and imperforate valves for moving the latter valves to open positions only when the said other valve is closed.

4. In a liquid dispensing device, a receptacle, a pump for supplying liquid to said receptacle, a pair of electric contact elements, means for weighing the liquid in the receptacle, said weighing means being operable to disengage said contact elements when the weight of liquid in the receptacle reaches a predetermined amount, electrically actuated means included in circuit with said contact elements for controlling and stopping the flow of liquid to said receptacle, means including a valve for dispensing any desired amount of the liquid contained in the receptacle, and a switch actuated with said valve and electrically connected to said electrically actuated control means for maintaining said control means in liquid flow stopping position while liquid is being dispensed from the receptacle.

5. In a liquid dispensing device, a receptacle, a pump for supplying liquid to said receptacle, means for weighing the liquid in the receptacle, means electrically connected to said weighing means for controlling and stopping flow of liquid from said pump to said receptacle, means including a valve for dispensing liquid from the receptacle, an electrically actuated latch for locking the valve in closed position, and electrical connections between said controlling and stopping means and said latch for actuating said latch to lock said valve in closed position while liquid is being supplied to said receptacle, and a switch in said electrical connections connected to and actuated with said valve for actuating said controlling and stopping means to stop the flow of liquid to said receptacle while said valve is open.

6. In a liquid dispensing device, a receptacle, a pump for supplying liquid to said receptacle, means energizable to permit the flow of liquid from said pump to said receptacle, means for weighing the liquid in said receptacle, means for dispensing any desired amount of the liquid contained in said receptacle, and means electrically connected to said energizable means and said weighing means and actuated with said dispensing means for de-energizing said energizable means to prevent said pump from supplying liquid to the receptacle when the liquid is being dispensed.

7. In a liquid dispensing device a receptacle, a pump for supplying liquid to the receptacle, means for weighing the liquid in the receptacle, means electrically connected to said weighing means for controlling the amount of liquid supplied to the receptacle, means including a valve for dispensing liquid from the receptacle, and a latch electrically connected to said control means and said weighing means for locking said valve in inoperative position when the pump is delivering liquid to said receptacle.

CHARLES S. HAZARD.